No. 761,889. PATENTED JUNE 7, 1904.
W. H. KEMPER.
GEAR AND BRAKE MECHANISM FOR AUTOMOBILES.
APPLICATION FILED FEB. 6, 1903.
NO MODEL. 4 SHEETS—SHEET 1.

No. 761,889. PATENTED JUNE 7, 1904.
W. H. KEMPER.
GEAR AND BRAKE MECHANISM FOR AUTOMOBILES.
APPLICATION FILED FEB. 6, 1903.
NO MODEL. 4 SHEETS—SHEET 3.

Fig 3

No. 761,889. PATENTED JUNE 7, 1904.
W. H. KEMPER.
GEAR AND BRAKE MECHANISM FOR AUTOMOBILES.
APPLICATION FILED FEB. 6, 1903.
NO MODEL. 4 SHEETS—SHEET 4.

No. 761,889.

Patented June 7, 1904.

UNITED STATES PATENT OFFICE.

WILLIAM H. KEMPER, OF DANVILLE, KENTUCKY, ASSIGNOR OF ONE-FOURTH TO ETHELBERT T. KEMPER, OF MEMPHIS, TENNESSEE.

GEAR AND BRAKE MECHANISM FOR AUTOMOBILES.

SPECIFICATION forming part of Letters Patent No. 761,889, dated June 7, 1904.

Application filed February 6, 1903. Serial No. 142,168. (No model.)

*To all whom it may concern:*

Be it known that I, WILLIAM H. KEMPER, a citizen of the United States, residing at Danville, in the county of Boyle, State of Kentucky, have invented certain new and useful Improvements in Gear and Brake Mechanism for Automobiles; and I do hereby declare the following to be a full, clear, and exact description of the invention, such as will enable others skilled in the art to which it appertains to make and use the same.

This invention relates to automobiles, and more particularly to the driving mechanism thereof, the invention having for its object to provide a construction wherein the driving-axle or a counter-shaft between the axle and motor may be driven at various speeds without changing the speed of the motor excepting as it may be modified by variations in load and to provide a mechanism wherein the vehicle may be relieved instantly of its motive power by instantly relieving the motor of its load at whatever speed the vehicle may be traveling.

An additional object of the invention is to provide a construction wherein by operation of a single lever the driving-axle or counter-shaft will be thrown out of gear with the motor and the brakes will be subsequently applied, the operation being reversed when the direction of movement of the lever is reversed.

Figure 1:
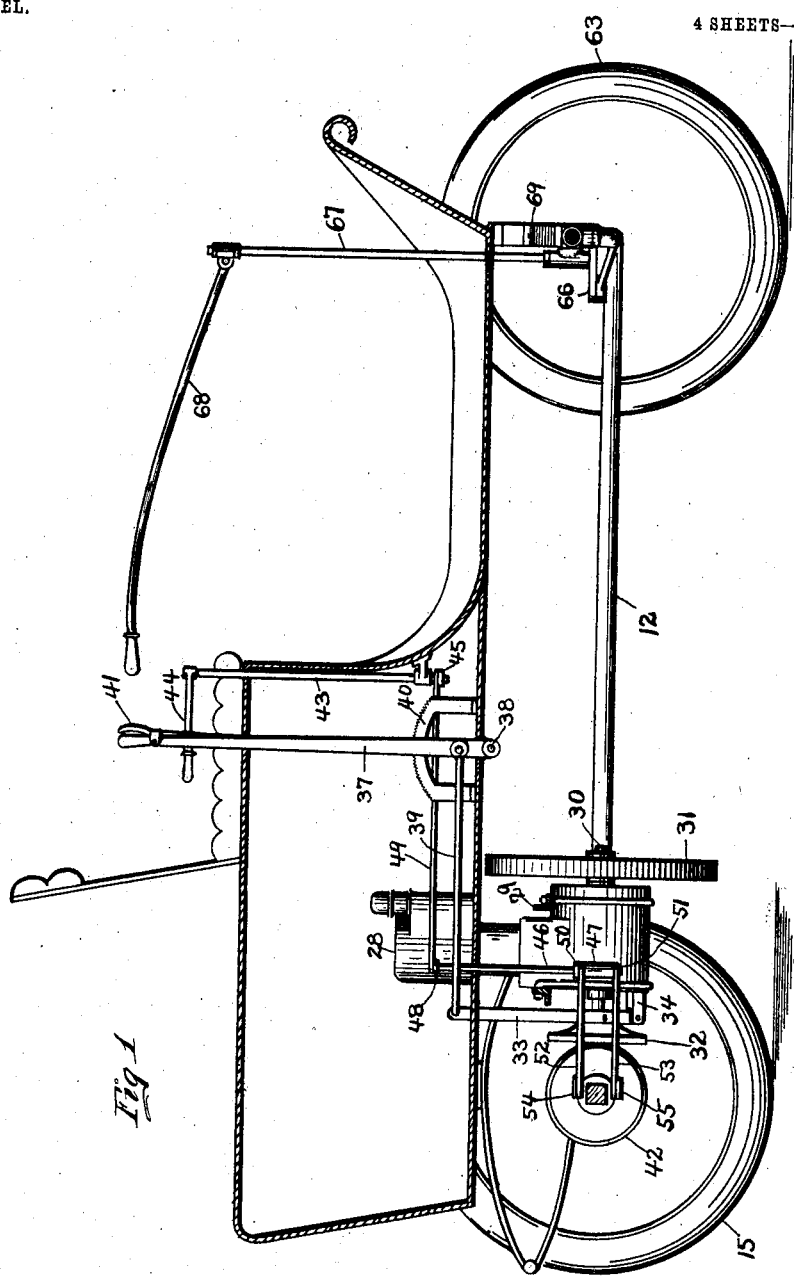
Figure 2:
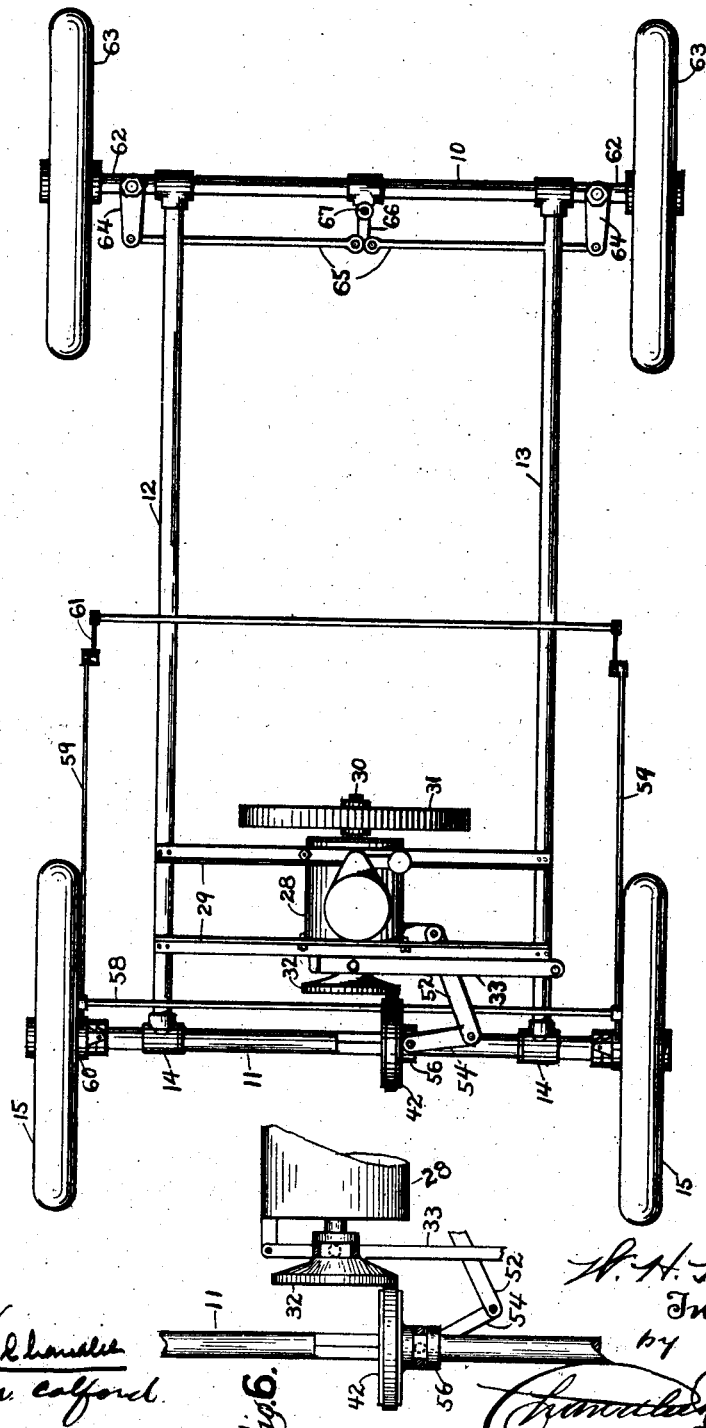
Figure 4:
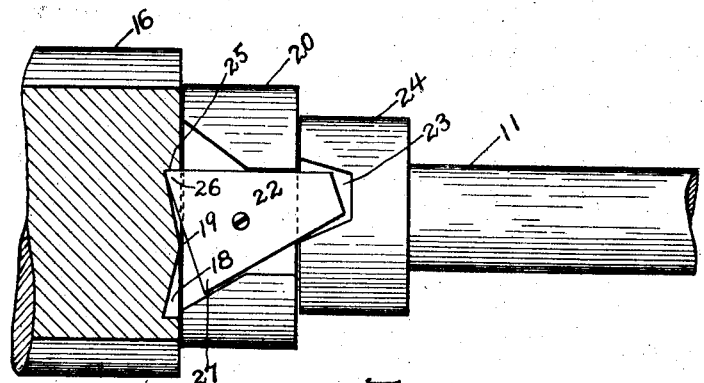
Figure 5:
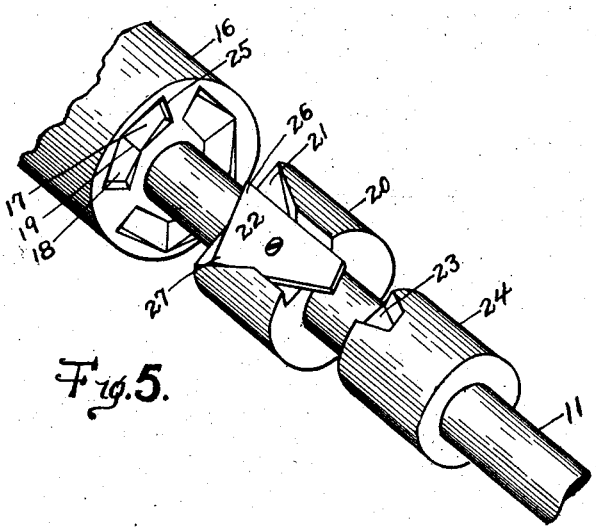

In the drawings forming a portion of this specification, and in which like numerals of reference indicate similar parts in the several views, Figure 1 is a vertical section taken longitudinally through the automobile embodying the present invention, the motor and other parts of the mechanism being shown in elevation. Fig. 2 is a top plan view of the running-gear. Fig. 3 is a rear elevation of the vehicle with the body in transverse vertical section. Fig. 4 is a detail plan view of the clutch mechanism employed between the axle and one of the driving-wheels, the hub of the wheel being shown partly in section in the plane of the dog. Fig. 5 is a perspective view showing the end of a wheel-hub with its clutch-face, the clutch-sleeve, with the dog carried thereby, and the clutch-collar which is fixed on the axle, the hub, the sleeve, and the collar being spaced apart to permit of better illustration. Fig. 6 is a bottom plan view showing portions of the engine-shaft and rear axle and illustrating the arrangement of the shifting collar on the hubs of the disk and friction-wheel.

Referring now to the drawings, the present vehicle comprises a running-gear including a front axle 10, a rear axle 11, and reach-bars 12 and 13, the front axle being rigidly connected to the reach-bars, while the rear axle is rotatably mounted in bearings 14 at the rear ends of said bars. For the rear axle 11 are provided driving-wheels 15, which are mounted for rotation upon the rear axle, and each of these driving-wheels is provided with a clutch mechanism having such construction that it will automatically shift to clutch the wheel to the drive-shaft in either direction of rotation of the axle, while permitting the wheel to rotate in either direction at a higher speed than the axle.

Upon reference to Figs. 4 and 5 of the drawings it will be noted that one member or element of the clutch is formed by the hub 16 of the wheel, the inner end face of the hub having pairs of recesses 17 and 18 therein, the recesses of each pair gradually increasing in depth from their adjacent ends, which meet at the narrow radial ridge 19. Upon the rear axle 11 is rotatably mounted a clutch-sleeve 20, in the curved face of which is a recess 21, in which is mounted pivotally a triangular dog 22, the base of which is adapted to lie flush with that end of the sleeve adjacent to the hub 16, while the apex of the triangular dog projects beyond the opposite end of the sleeve and engages loosely in the recess 23, formed in the face of a collar 24, which is fixed upon the axle 11, said recess opening through the end of the collar. With this construction if the axle 11 be rotated forwardly a wall of the recess 23 will strike the dog 22 and swing the latter pivotally until it projects with one base angle beyond the end of the sleeve 20 and in engagement with either of the recesses 17 and 18 of a pair of recesses. If the base angle of the dog initially engages a recess 18, it will travel into and through said recess until it strikes the end wall 25 thereof and during the remainder of its movement will carry the hub 16 with it. Should the dog when it is thus shifted enter its forward base angle 26 in a recess 17, said angle would gradually rise from the recess as the dog approached the ridge 19 and would then sink into the succeeding recess 18 with the result above described. If then the wheel be rotated at a greater speed than the shaft, as is the case when it is the outside wheel on a curve, such movement of the wheel will carry its hub, with the ridge 19, gradually in the direction of the base-angle 26, with the result that the dog will be swung pivotally from engagement with the hub to permit of rotation of the wheel independently of the axle.

When the direction of rotation of the axle is reversed, the collar 24 serves first to shift the dog pivotally to move the angle 26 from the hub and carry the angle 27 into engaging position, said angle having the same operation as above described in connection with the angle 26, so that the wheel will be rotated in a reverse direction, but will be free to rotate independently of the axle at a higher speed than the axle.

To rotate the axle 11, a motor is provided and in the present instance is shown as a vertical gas-engine 28, which is securely bolted to a bed consisting of the angle-bars 29, secured transversely to the reach-bars 12 and 13. The engine 28 has a shaft 30, at the forward end of which is the fly-wheel 31, while at the rear end portion is a friction-disk 32, which is splined to the shaft, so that it may be shifted longitudinally thereof, said wheel being shifted by means of the lever 33, pivoted to a bracket 34 on the engine and connected with a collar 35, engaged in a circumscribing groove 36 in the hub of the friction-disk. A hand-lever 37 is fixed to a shaft 38, which is pivotally mounted transversely of the running-gear, and this hand-lever is connected with the upper end of the lever 33 by means of a rod 39, so that when the lever 37 is shifted the lever 33 will be operated to correspondingly move the friction-disk on the engine-shaft. A notched segment 40 is provided for engagement by a latch 41 on the hand-lever for holding the latter at different points of its movement.

Splined upon the rear axle 11 is a friction wheel or pulley 42, which is disposed in a plane at right angles to the plane of the friction-disk to engage its periphery with the flat face of the friction-disk, the slidable mounting of this friction-pulley permitting it to be shifted toward and away from the center and to either side of the center of the friction-disk, so that the friction-pulley will be rotated at various speeds either forwardly or rearwardly, it being noted that the axes of the axle and engine-shaft intersect.

When the friction-pulley is at the center of the friction-disk, it will receive no motion from the latter, and when it is adjacent to the periphery of the disk it will receive its maximum motion, while at whatever position the friction-pulley may be with respect to the friction-disk the friction-disk may be instantly withdrawn from contact with the pulley to relieve the driving-axle of its motor.

To shift the pulley 42, a vertical shaft 43 is provided upon the body of the vehicle, said shaft having an operating-lever 44 at its upper end and a second lever or arm 45 at its lower end. A second vertical shaft 46 is mounted in a bearing 47 or bracket upon the engine and has a crank-arm 48 at its upper end, which is connected by the rod 49 with the arm 45, and at the lower end portion of the shaft 46 are spaced laterally-directed arms 50 and 51, to which are pivoted links 52 and 53, which are pivoted in turn to links 54 and 55, pivoted to a collar 56, which is rotatably engaged in a circumscribing groove 57 in the hub of the pulley-wheel 42. Thus as the shaft 43 is rotated in one direction the pulley-wheel 42 is slid longitudinally of the axle in one direction, and when the shaft 43 is rotated in the opposite direction the pulley-wheel is shifted in the opposite direction.

Transversely of the rear portion of the running-gear is arranged a brake-rod support 58, in which are slidably mounted the brake-rods 59, connected at their rear ends to band-brakes 60 on the hubs of the driving-wheels, while their forward ends are connected to the crank-arms 61 of the shaft 38, the adjustments being such that when the lever 37 is shifted sufficiently far to move the friction-disk from the friction-wheel further movement of said lever will apply the brakes. Thus in the case of emergency the vehicle may be brought to a sudden stop.

The spindles 62 of the front wheel 63 are pivotally connected with the front axle in the usual manner and have the knuckles 64, to which are connected rods 65, pivoted also to the arms 66 of the post 67, which is taken upwardly through the body of the vehicle and has a steering-lever 68 at its upper end. Between the front axle and the body of the vehicle is also the usual spring 69.

What is claimed is—

1. The combination with a drive-shaft and a driven shaft, of a friction-disk on the drive-shaft, a friction-pulley on the driven shaft in peripheral contact with the face of the disk and shiftable thereover, the friction-disk being shiftable bodily out of contact with the friction-pulley, a brake mechanism for the driven shaft and a lever connected with the disk and brake mechanism and adapted to first move the disk out of contact with the pulley and to then operate the brake mechanism.

2. In a drive mechanism for automobiles, the combination with a drive-shaft, and driven shaft, of a friction-disk on the drive-shaft, a friction-pulley on the driven shaft in peripheral contact with the face of the disk and shiftable thereover, the friction-disk being shiftable bodily out of contact with the friction-pulley, a brake mechanism for the driven shaft, a rock-shaft mounted adjacent to the driving mechanism, connections between the shaft and brake mechanism, a lever secured to the rock-shaft and connections between the lever and disk to shift the latter through movement of the former, said lever being adapted for operation to shift the disk and apply the brake mechanism successively.

3. The combination with a drive-shaft and a driven shaft, of a friction-disk on the drive-shaft, a friction-pulley on the driven shaft in peripheral contact with the face of the disk and shiftable thereover, the friction-disk being shiftable bodily out of contact with the friction-pulley, a brake mechanism for the driven shaft and a single means connected with the disk and brake mechanism for shifting them successively.

4. The combination with a drive-shaft and a driven shaft, of a friction-disk splined upon the drive-shaft, a friction-pulley splined upon the driven shaft for movement in peripheral contact with the friction-disk diametrically thereof, means for shifting the pulley on its shaft, a brake mechanism for the driven shaft, and a single means connected with the friction-disk and the brake mechanism for operating them successively.

In testimony whereof I affix my signature in presence of two witnesses.

WILLIAM H. KEMPER.

Witnesses:
I. L. BRUCE,
R. G. McKEE.